United States Patent [19]
Moran

[11] Patent Number: 4,882,373
[45] Date of Patent: Nov. 21, 1989

[54] ASPHALTIC COMPOSITION

[75] Inventor: Lyle E. Moran, Sarnia, Canada

[73] Assignee: Exxon Research and Engineering Company, Florham Park, N.J.

[21] Appl. No.: 232,210

[22] Filed: Aug. 15, 1988

Related U.S. Application Data

[63] Continuation-in-part of Ser. No. 77,379, Jul. 24, 1987, abandoned.

[51] Int. Cl.$^4$ .................. C08K 3/24; C08L 53/02; C08L 95/00
[52] U.S. Cl. .................. 524/68; 523/307; 523/351; 524/71
[58] Field of Search .............. 524/68, 71; 523/307, 523/351

[56] References Cited

U.S. PATENT DOCUMENTS

| | | | |
|---|---|---|---|
| 4,454,269 | 6/1984 | Goodrich | 524/69 |
| 4,460,723 | 7/1984 | Rollmann | 524/68 |
| 4,485,201 | 11/1984 | Davis | 524/68 |
| 4,490,493 | 12/1984 | Mikols | 524/68 |
| 4,530,652 | 7/1985 | Buck et al. | 524/68 |
| 4,677,146 | 6/1987 | Senz | 524/69 |

OTHER PUBLICATIONS

Abstract of Japanese Patent 56-115354, 9/81.

Primary Examiner—Allan M. Lieberman
Attorney, Agent, or Firm—John W. Ditsler

[57] ABSTRACT

An asphaltic composition having improved tensile properties is disclosed. Also disclosed is a method for producing said composition which comprises:

A. contacting an asphalt with a mineral acid;
B. contacting the acid modified asphalt thus formed with an oxygen-containing gas;
C. adding a thermoplastic elastomer to the acid/oxygen modified asphalt thus formed; and
D. adding an unsaturated functional monomer to the polymer modified asphalt.

In a preferred embodiment, the asphalt is contacted with an oxygen-containing gas prior to and during contact with the mineral acid.

36 Claims, No Drawings

ASPHALTIC COMPOSITION

CROSS-REFERENCE TO RELATED APPLICATIONS

This application is a continuation-in-part of U.S. application Ser. No. 077,379, filed July 24, 1987, now abandoned.

BACKGROUND OF THE INVENTION

1. Field of the Invention

The present invention relates to an improved asphaltic composition and its method of manufacture. More specifically, this invention is directed to an asphaltic composition having increased tensile properties which comprises asphalt, a mineral acid, a thermoplastic polymer and an unsaturated functional monomer.

2. Discussion of Related Art

Asphalt is a bituminous material resulting from the distillation of crude oil. Typically, asphalt is derived from the bottoms of a vacuum distillation tower and has an atmospheric boiling point of at least 400° C. Because it is hydrophobic and has good adhesiveness and weatherability, asphalt has been used widely as a binder in paving materials and as a coating for roofing shingles.

However, the properties of asphalt are known to vary with temperature. For example, at low temperatures (i.e. temperatures below about 0° C.), it becomes hard and brittle, but will soften and creep at high temperatures (i.e. temperatures above about 40° C.). Accordingly, various methods have been suggested for improving the performance of asphalt at these temperature extremes.

In one method, asphalt's tendency to soften and creep at high temperatures is decreased when the asphalt is polymerized by undergoing oxidative dehydrogenation in which the said asphalt is contacted with an oxygen-containing gas (usually air) at temperatures ranging between about 200° C. and about 300° C. for a period of time ranging between about 6 and about 24 hours. This procedure is described in detail by L. W. Corbett in Bituminous Materials: Asphalts, Tars and Pitches, Interscience Publishers, New York (1965) and by E. B. Barth in Asphalt Science and Technology, Gordon and Breach Science Publishers, New York (1968), the disclosures of each being incorporated herein by reference.

In another method, a mineral acid such as phosphoric acid is added to the asphalt to improve its thermal stability, ductility and adhesiveness relative to straight-run asphalts (i.e. residues from the vacuum distillation of crude oil) which have undergone oxidative dehydrogenation.

Yet another way to decrease asphalt's tendency to soften and creep at high temperatures (as well as to improve its low temperature flexibility and solid-like properties) is to add thermoplastic elastomers such as styrene-butadiene-styrene ("SBS") block copolymers. The addition of such polymers serve to modify asphalt for additional applications, such as roofing sheets, adhesives and coatings. For example, German Patent No. 2,255,173 discloses the addition of thermoplastic block copolymers (such as SBS copolymer) to straight-run asphalt after which small amounts of mineral acid (such as phosphoric acid or hydrochloric acid) are added to stabilize the resulting product, which has higher elasticity and greater range of plasticity than straight-run asphalts. However, no mention is made of contacting the asphalt with an oxygen-containing gas.

In another example, Japanese Patent No. 51-53522 discloses an asphaltic composition having improved strength due to the addition of a natural or synthetic rubber (e.g. styrene-butadiene copolymer) and an unsaturated acid, including the anhydrides of said acid. The asphaltic material may be straight-run asphalt, semi-blown asphalt, blown asphalt, tar, pitch or mixtures thereof. In addition, Japanese Patent No. 56-115354 teaches pre-reacting SBS polymer with unsaturated dicarboxylic acids and derivatives thereof (such as maleic acid, fumaric acid, chloromaleic acid, itaconic acid, cis-4-cyclohexene-1,2-dicarboxylic acid, endo-cis-bicyclo (2,2,1)-5-heptane-2,3-dicarboxylic acid, and acid anhydrides, esters, amides, imides, etc. of the dicarboxylic acid) and adding the mixture thus formed to asphalt to improve its adhesiveness, strength and deformation resistance. The resulting product is useful as a pavement structure for roadways which experience heavy repetitive loads. Among the preferred dicarboxylic acids and derivatives thereof are maleic acid, fumaric acid, and maleic anhydride. However, neither Japanese patent teaches or suggests contacting the asphalt with a mineral acid prior to addition of the polymer.

Accordingly, none of the foregoing references, alone or in combination, teach or suggest applicant's composition nor the particular method by which said composition is formed.

SUMMARY OF THE INVENTION

According to the present invention, it has been discovered that an asphaltic composition comprising a mineral acid, a thermoplastic elastomer and an unsaturated functional monomer has improved tensile properties relative to that obtained in the absence of the unsaturated functional monomer. The present invention also contemplates a method for producing the improved asphaltic composition, said method comprising:

A. contacting an asphalt with a mineral acid to form an acid modified asphalt;

B. contacting said acid modified asphalt with an oxygen-containing gas to form an acid/oxygen modified asphalt;

C. contacting a thermoplastic elastomer with said acid/oxyqen modified asphalt to form a polymer modified asphalt: and D. contacting an unsaturated functional monomer with said polymer modified asphalt to form a product having improved tensile properties relative to said polymer modified asphalt.

In a preferred embodiment, the asphalt is contacted with an oxygen-containing gas prior to and during contact with the mineral acid.

DETAILED DESCRIPTION OF THE INVENTION

As a first step in the present invention, an asphalt is contacted with a mineral acid to form an acid modified asphalt having an increased adhesiveness relative to the untreated asphalt. The asphalt utilized may be obtained from a variety of sources including straight-run vacuum residua; mixtures of vacuum residual with diluents such as vacuum tower wash oil, paraffin distillate, aromatic and naphthenic oils and mixtures thereof; oxidized vacuum residues or oxidized mixtures of vacuum residues and diluent oils and the like. Other asphaltic materials such as coal tar pitch, rock asphalt and naturally occurring asphalt may also be used. Typically, the asphalt will have an atmospheric boiling point of at least 380° C., more typically at least 440° C.

The mineral acid is preferably added to the asphalt over an extended period of time (e.g. about 20 to about 60 minutes) to avoid foaming which may occur if all the acid were added at one time. The final mineral acid content of the asphalt is not critical, but normally should range between about 0.25 and about 4.0 wt. %, preferably between about 1.25 and about 2.5 wt. %, of the asphalt. Preferably, the mineral acid utilized will be selected from the group consisting of phosphoric acid, sulfuric acid and mixtures thereof, with phosphoric acid being particularly preferred. The conditions at which the asphalt and mineral acid are contacted are within the range of conditions described below for contacting the acid modified asphalt with an oxygen-containing gas.

The acid modified asphalt thus formed is then contacted (preferably admixed) with an oxygen-containing gas, usually air. Typically, the gas is sparged into a mixing vessel near the bottom at a rate ranging between about 20 and about 70 L/h/kg, preferably between about 20 and about 55 L/h/kg. The gas addition is normally conducted for a period of time ranging about 1 and about 12 hours, preferably between about 1 and about 6 hours. In a preferred embodiment, the asphalt is "pre-oxidized" by contact with an oxygen-containing gas from one-half to two hours prior to contact with the mineral acid. Most preferably, the asphalt will continue to be contacted with the oxygen-containing gas during contact with the mineral acid. Thus the term "oxidized asphalt" as used herein refers to an asphalt to which a oxygen-containing gas has been added. Contact with an oxygen-containing gas tends to increase the thermal stability of the asphalt, particularly when the asphalt is "pre-oxidized". During contact with the gas, the temperature of the asphalt should be maintained between about 200° C. and about 300° C. Ambient pressure is normally employed during said gas contacting.

A thermoplastic elastomer is then contacted with, or added to, the asphalt following acid addition and contact with the oxygen-containing gas to form a product that has improved tensile properties (as measured by decreased elongation and increased tensile strength and modulus of elasticity) relative to the properties of the untreated asphalt; i.e. the asphalt prior to acid addition. The thermoplastic elastomers suitable for use in the present invention are polymers derived from the combination of a continuous elastomeric phase and a separate, discontinuous crystalline phase which softens at elevated temperatures. They can be characterized as physically cross-linked, unvulcanized rubbers which can be processed as a thermoplastic at high temperatures, but behave as a high strength, resilient rubber at low temperatures. Classes of thermoplastic elastomers that can be used include those based on styrenics, olefinics, urethanes, copolyesters or their mixtures, with styrenics being preferred. A preferred styrenic thermoplastic elastomer is styrene-butadiene-styrene block copolymer, although other styrenic thermoplastic elastomeric compounds (such as styrene-isoprene-styrene, and the like) may be utilized. (See for example G. E. O'Connor and M. A. Fath "Thermoplastic Elastomers Part 1: Can TPEs Compete Against Thermoset Rubbers", Rubber World (December 1981) and B. Walker, Handbook of Thermoplastic Elastomers, Van Nostrand Reinhold Co. (1979)).

The thermoplastic elastomer will normally comprise between about 5 and about 25 wt. %, preferably between about 5 and about 15 wt. %, of the asphalt. However, enhanced tensile properties will tend to diminish at concentrations below about 5 wt. % and phase inversion is more likely to occur at concentrations above about 25 wt. %. Polymer addition should occur at a temperature between about 160° and about 220° C., preferably between about 180° and about 210° C. At temperatures greater than about 220° C., phase incompatibility tends to result, while the polymer tends not to be dispersed properly at temperatures below about 160° C. Ambient pressure is normally used during polymer addition.

The tensile properties of the asphaltic composition thus formed may be further improved by contact with, or by the addition of, an unsaturated functional monomer selected from the group consisting of an unsaturated carboxylic acid, an unsaturated dicarboxylic acid, an unsaturated anhydride, an unsaturated ester, an unsaturated imide and mixtures thereof. Preferred unsaturated carboxylic acids are acrylic acid, crotonic acid, methacrylic acid, and mixtures thereof. Among the preferred unsaturated dicarboxylic acids are maleic acid, fumaric acid, cis-4-cyclohexene-1,2-dicarboxylic acid, endo-cis-bicyclo(2,2,1) 5 heptane-2,3 dicarboxylic acid, itaconic acid, and mixtures thereof. Preferred unsaturated anhydrides are maleic anhydride, citraconic anhydride, 2,3 dimethylmaleic anhydride, and endo bicyclo (2,2,2) oct-5-ene-2,3,dicarboxylic anhydride. Among the preferred unsaturated esters are benzyl, butyl-, cyclohexyl-, ethyl-, and methyl-acrylate and butyl-, ethyl-, isobutyl-, isopropyl-methyl- and propyl-methacrylate. Preferred unsaturated imides include maleimide, methylmaleimide, ethylmaleimide, and phenylmaleimide.

Addition of the unsaturated functional monomer to the polymer modified asphalt should occur at a temperature above about 120° C. to facilitate mixing, but at no more than a temperature of about 200° C. to minimize volatilization of said monomer. Preferably the temperatures should range from about 150° to about 180° C. After reaction of the monomer with the polymer modified asphalt, the temperature should be raised to greater than 200° C. to volatilize excess monomer present. The unsaturated functional monomer will typically comprise between about 0.3 and about 15 wt. %, preferably between about 0.5 and about 5 wt. %, of the asphalt. Amounts below about 0.3 wt. % will likely not be sufficient to improve the tensile properties. Amounts greater than about 15 wt. % could be used but would likely constitute an excess which would be volatilized when the composition is heated above about 200° C.

The asphalt may be mixed or blended with the mineral acid, thermoplastic elastomer and unsaturated functional monomer in any number of ways which can readily be selected by one skilled in the art. Suitable means include external mixers, roll mills, internal mixers, Banbury mixers, screw extruders and the like.

The asphalt composition thus formed may be suitably employed in essentially any service which requires a product which is flexible, tough and resilient. Examples of such applications include binding agents, sound and vibration dampening materials, coatings that do not cut easily and return to the original shape but are water resistant, and the like.

The present invention will be further understood by reference to the following Comparative Examples and Examples which are not intended to restrict the scope of the claims appended hereto.

COMPARATIVE EXAMPLE I

Approximately 1000 g of a Cold Lake vacuum distilled asphalt having a penetration of 200–300 mm/10, as determined by ASTM test D5, was air blown at 260° C. at a rate of 50 L/h/kg in an autoclave equipped with internal baffles and stirred at 1725 rpm. The sample had a softening point of 43.9° C. based on ASTM test D36, the disclosure of which is incorporated herein by reference, and a penetration of 98 mm/10 utilizing ASTM test D5, the disclosure of which also is incorporated herein by reference.

COMPARATIVE EXAMPLE II

The same feed as in Comparative Example I was utilized. However in this Example, approximately 18 g of phosphoric acid was added to the asphalt over a one hour period prior to air blowing. The sample was air blown for a total of 0.5 hours at a temperature of about 260° C. with air being sparged into the vessel at 50 L/h/kg after commencement of the phosphoric acid addition. The phosphoric acid was added over a 25 minute period. The softening point of the sample was measured to be 48.7 by ASTM test D36 and the penetration was measured to be 93 mm/10 using ASTM test D5.

COMPARATIVE EXAMPLE III

A 1000 g sample of the asphaltic material used in Comparative Example I again was utilized. However, in this Example the asphaltic material was air blown for approximately 0.5 hours at 260° C, with air being sparged at 50 L/h/kg prior to the addition of 18 g of phosphoric acid to the asphalt. The softening point and penetration were measured to be 58.5° C. and 57 mm/10, respectively.

COMPARATIVE EXAMPLE IV

An 800 g sample of the asphalt of Comparative Example I was air blown at 260° C. at a rate of 50 L/h/kg for 0.75 hours. The sample was cooled to 190° C. and 88 g of SBS copolymer was added over a two hour period. The resulting composition as admixed at 190° C. for an additional 2 hours, after which the softening point and penetration were measured to be 95° C. and 38 mm/10, respectively.

EXAMPLE I

An 800 g sample of the asphalt produced in Comparative Example II was utilized. The sample was then cooled to 190° C., after which 88 g of SBS block copolymer was added as above. The asphaltic composition was admixed for an additional 2 hours. The softening point and penetration were measured to be 93.8° C. and 36 mm/10, respectively.

EXAMPLE II

An 800 g sample of the asphalt produced in Comparative Example III was utilized. The sample was cooled to 190° C. after which 88 g of SBS block copolymer was added to the sample as described above. The sample was then stirred at 190° C. for an additional 2 hours. The softening point and penetration were measured to be 93.3° C. and 28 mm/10, respectively.

COMPARATIVE EXAMPLE V 200 g of the asphalt produced in Comparative Example IV was heated to 150° C. and 22 g of maleic anhydride was added after the SBS addition. The composition was admixed for an additional 2 hours. The temperature was then raised to 200° C. and stirred until excess maleic anhydride was removed (about 2–3 hours). The tensile strength at break was measured to be 1147 KPa, utilizing ASTM test D412, the disclosure of which is incorporated herein by reference. The percent elongation and the modulus of elasticity were measured to be 1424 and 0.259 MPa, respectively, utilizing ASTM test D-412.

EXAMPLE III 200 g of the asphalt produced in Example I was heated to 150° C. and 22 g of maleic anhydride was added after SBS addition. The composition was admixed for 2 hours. The temperature was then raised to 200° C. and stirred until excess maleic anhydride was removed (about 2–3 hours). The tensile strength at break was measured to be 1047 KPa. The percent elongation and the modulus of elasticity were measured to be 819 and 0.316 MPa, respectively.

EXAMPLE IV 200 g of the asphalt produced in Example II was heated to 150° C. and 22 g of maleic anhydride added after SBS addition. The composition was admixed for 2 hours. Then, the temperature was raised to 200° C. and stirred until excess maleic anhydride was removed (about 2–3 hours). The tensile strength at break was measured to be 1366 KPa. The percent elongation and the modulus of elasticity were measured to be 469 and 0.667 MPa, respectively.

A summary of Examples I–IV and Comparative Examples I–V is presented in Table I below.

TABLE I

| | | Composition (g) | | | | Product Properties | | | Modulus of Elasticity/ MPa |
|---|---|---|---|---|---|---|---|---|---|
| Row | Test No. | Asphalt | Phosphoric Acid | S—B—S Polymer | Maleic Anhydride | S.P. °C. | Penetration/ 25° C. | Tensile Strength/ KPa | % Elongation | |
| 1. | Comp. Ex. I | 1000 | — | — | — | 43.9 | 98 | — | — | — |
| 2. | Comp. Ex. II | 1000 | 18 | — | — | 48.7 | 93 | — | — | — |
| 3. | Comp. Ex. III | 1000 | 18 | — | — | 58.5 | 57 | — | — | — |
| 4. | Comp. Ex. IV | 800 | — | 88 | — | 95.0 | 38 | — | — | — |
| 5. | Example I | 800 | 18 | 88 | — | 93.8 | 36 | — | — | — |
| 6. | Example II | 800 | 18 | 88 | — | 93.3 | 28 | — | — | — |
| 7. | Comp. Ex. V. | 200 | — | 88 | 22 | (1) | (1) | 1147 | 1424 | 0.259 |
| 8. | Example III | 200 | 18 | 88 | 22 | (1) | (1) | 1047 | 819 | 0.316 |

TABLE I-continued

| Row | Test No. | Composition (g) | | | | Product Properties | | | | Modulus of Elasticity/ MPa |
|---|---|---|---|---|---|---|---|---|---|---|
| | | Asphalt | Phosphoric Acid | S—B—S Polymer | Maleic Anhydride | S.P. °C. | Penetration/ 25° C. | Tensile Strength/ KPa | % Elongation | |
| 9. | Example IV | 200 | 18 | 88 | 22 | (1) | (1) | 1366 | 469 | 0.667 |

(1) Too Rubbery and Resilient to Measure.
(2) Summary of reaction steps
(a) Row 1 - air blowing alone
Row 4 - air blowing + SBS addition
Row 7 - air blowing + SBS addition + maleic anhydride
(b) Row 2 - air blowing + H$_3$PO$_4$ same time
Row 5 - air blowing + H$_3$PO$_4$ same time + SBS addition
Row 8 - air blowing + H$_3$PO$_4$ same time + SBS addition + maleic anhydride
(c) Row 3 - pre-air blowing then air blowing + H$_3$PO$_4$ same time
Row 6 - pre-air blowing then air blowing + H$_3$PO$_4$ same time + SBS addition
Row 9 - pre-air blowing then air blowing + H$_3$PO$_4$ same time + SBS addition + maleic anhydride Rows 1, 4 and 7 of Table I show that by air blowing asphalt, then adding SBS polymer followed by reaction with maleic anhydride, a modified asphalt material is produced that has high tensile strength and elongation with relatively low elastic modulus (i.e. the asphalt is soft).

Rows 2, 5 and 8 show that by air blowing in the presence of phosphoric acid (i.e. at the same time), then adding the SBS polymer and subsequent reaction with maleic anhydride, a product with comparable tensile strength, lower but adequate elongation and higher elastic modulus (i.e. stiffer and tougher) is formed.

Rows 3, 6, and 9 show that if the asphalt is pre-air blown, then air blown with phosphoric acid followed by the addition of SBS and maleic anhydride, the product has comparable tensile strength, even lower elongation (but still adequate) and even higher elastic modulus.

The Comparative Examples, Examples and data in Table I demonstrate that if asphalt is air blown with phosphoric acid to increase adhesiveness, blended with SBS polymer and reacted with maleic anhydride, a product is formed that unexpectedly has adequate elongation, high tensile strength and higher elastic modulus compared with an asphalt treated in the same fashion but without phosphoric acid addition. The new product is tougher, has excellent and unusual resilience, extremely slow elastic recovery and increased adhesiveness.

What is claimed is:

1. An asphaltic composition having improved tensile properties that is produced by the method comprising:
   (a) contacting asphalt with from about 0.25 to about 4 wt. % of a mineral acid to form an acid modified asphalt,
   (b) contacting said acid modified asphalt with an oxygen-containing gas to form an acid/oxygen modified asphalt, the temperature of the asphalt during said contacting in (a) and (b) being maintained between about 200° C. and about 300° C.,
   (c) contacting said acid/oxygen modified asphalt with from about 5 to about 25 wt. % of a thermoplastic elastomer at a temperature between about 160° C. to form a polymer modified asphalt, and
   (d) contacting said polymer modified asphalt with from about 0.3 to about 15 wt. % of an unsaturated functional monomer selected from the group consisting of an unsaturated carboxylic acid, an unsaturated dicarboxylic acid, an unsaturated anhydride, an unsaturated ester, an unsaturated imide and mixtures thereof at a temperature above about 120° C. but not more than about 200° C.

2. The composition of claim 1 wherein the mineral acid is selected from the group consisting of phosphoric acid, sulfuric acid, and mixtures thereof.

3. The composition of claim 2 wherein the mineral acid comprises phosphoric acid.

4. The composition of claim 1 wherein the asphalt is contacted with an oxygen-containing gas prior to contact with said mineral acid.

5. The composition of claim 4 wherein said oxygen-containing gas is air.

6. The composition of claim 2 wherein the thermoplastic elastomer is based on styrenics, olefins, urethanes, copolyesters, or mixtures, thereof.

7. The composition of claim 3 wherein the thermoplastic elastoner comprises styrene-butadiene-styrene, the unsaturated functional monomer is selected from the group consisting of maleic acid, maleic anyhydride and mixtures thereof, and the oxygen-containing gas is air.

8. The composition of claim 6 wherein the thermoplastic elastomer is based on styrenics.

9. The composition of claim 8 wherein the thermoplastic elastomer comprises styrene-butadiene-styrene.

10. The composition of claim 6 wherein the unsaturated functional monomer comprises an unsaturated carboxylic acid selected from the group consisting of acrylic acid, crotonic acid, methacrylic acid, and mixtures thereof.

11. The composition of claim 6 wherein the unsaturated functional monomer comprises an unsaturated dicarboxylic acid selected from the group consisting of maleic acid, fumaric acid, cis-4-cyclohexene-1,2-dicarboxylic acid, endo-cis-bicyclo (2,2,1) 5 heptane-2,3 dicarboxylic acid, itaconic acid, and mixtures thereof.

12. The composition of claim 6 wherein the unsaturated functional monomer comprises an unsaturated anhydride selected from the group consisting of maleic anhydride, citraconic anhydride, 2,3 dimethylmaleic anhydride, endo bicyclo (2,2,2) oct-5-ene-2,3 dicarboxylic anhydride and mixtures thereof.

13. The composition of claim 6 wherein the unsaturated functional monomer comprises an unsaturated imide selected from the group consisting of maleimide, methyl maleimide, ethylmaleimide, phenylmaleimide and mixtures thereof.

14. The composition of claim 6 wherein said unsaturated functional monomer is selected from the group consisting of maleic acid, maleic anhydride and mixtures thereof.

15. The composition of claim 14 wherein from about 1.25 to about 2.5 wt. % of said mineral acid is present therein.

16. The composition of claim 15 wherein from about 5 to about 15 wt. % of said thermoplastic elastomer is present therein.

17. The composition of claim 16 wherein from about 0.3 to about 5 wt. % of said unsaturated functional monomer is present therein.

18. A method for producing an asphaltic composition having improved tensile properties which comprises:
 (a) contacting asphalt with from about 0.25 to about 4 wt. % of a mineral acid to form an acid modified asphalt,
 (b) contacting said acid modified asphalt with an oxyqen-containing gas to form an acid/oxygen modified asphalt, the temperature of the asphalt during said contacting in (a) and (b) being maintained between about 200° and about 300° C.,
 (c) contacting said acid/oxygen modified asphalt with from about 5 to about 25 wt. % of a thermoplastic elastomer at a temperature between about 160° and about 220° C. to form a polymer modified asphalt, and
 (d) contacting said polymer modified asphalt with from about 0.3 to about 15 wt. % of an unsaturated functional monomer selected from the group consisting of an unsaturated carboxylic acid, an unsaturated dicarboxylic acid, an unsaturated anhydride, an unsaturated ester, an unsaturated imide and mixtures thereof at a temperature above about 120° C. but no more than about 200° C.

19. The method of claim 18 wherein the asphalt is contacted with an oxygen-containing gas prior to contact with said mineral acid.

20. The method of claim 19 wherein said oxygen-containing gas is air.

21. The method of claim 18 wherein said mineral acid is selected from the group consisting of phosphoric acid, sulfuric acid and mixtures thereof.

22. The method of claim 21 wherein said mineral acid comprises phosphoric acid.

23. The method of claim 21 wherein the thermoplastic elastomer is based on styrenics, olefinics, urethanes, copolyesters, or mixtures thereof.

24. The method of claim 23 wherein the thermoplastic elastomer is based on styrenics.

25. The method of claim 24 wherein the thermoplastic elastomer comprises styrene-butadiene-styrene.

26. The method of claim 23 wherein the unsaturated functional monomer comprises an unsaturated carboxylic acid selected from the group consisting of acrylic acid, crotonic acid, methacrylic acid, and mixtures thereof.

27. The method of claim 23 wherein the unsaturated functional monomer comprises an unsaturated dicarboxylic acid selected from the group consisting of maleic acid, fumaric acid, cis-4-cyclohexene-1,2-dicarboxylic acid, endo-cis-bicyclo (2,2,1) 5 heptane2,3 dicarboxylic acid, itaconic acid, and mixtures thereof.

28. The method of claim 23 wherein the unsaturated functional monomer comprises an unsaturated anhydride selected from the group consisting of maleic anhydride, citraconic anhydride, 2,3 dimethylmaleic anhydride, endo bicyclo (2,2,2) oct-5-ene-2,3 dicarboxylic anhydride and mixtures thereof.

29. The method of claim 23 wherein the unsaturated functional monomer comprises an unsaturated imide selected from the group consisting of maleimide, methyl maleimide, ethylmaleimide, phenylmaleimide and mixtures thereof.

30. The method of claim 23 wherein said unsaturated functional monomer is selected from the group consisting of maleic acid, maleic anhydride and mixtures thereof.

31. The method of claim 18 wherein the temperature in (c) is between about 180° and about 210° C.

32. The method of claim 31 wherein the temperature in (d) is between 150° and about 180° C.

33. A method for producing an asphaltic composition having improved tensile properties which comprises:
 (a) passing air through an asphalt having an atmospheric boiling point of at least 380° C., which is maintained at a temperature of about 200° C. to about 280° C. for a period of time ranging between about 0.5 to about 2 hours to form an air blown asphalt;
 (b) subsequently adding between about 0.25 and about 4 wt. % phosphoric acid to the air blown asphalt and passing air through said air blown asphalt for an additional period of time ranging from about 1 to about 12 hours to form an acid/air modified asphalt;
 (c) adding between about 5 to about 25 wt. % styrene-butadiene-styrene block copolymer to said acid/air modified asphalt at a temperature between about 160° and about 220° C. to form a polymer modified asphalt; and
 (d) adding between about 0.3 and about 15 wt. % of an unsaturated functional monomer selected from the group consisting of maleic acid, maleic anhydride and mixtures thereof to said polymer modified asphalt at a temperature above about 120° C. but no more than about 200° C.

34. The method of claim 33 wherein between about 5 to about 15 wt. % of said styrene-butadiene-styrene block copolymer is added to said acid/air modified asphalt in (c) and from about 0.3 to about 5 wt. % of said unsaturated functional monomer is added to said polymer modified asphalt in (d).

35. The composition formed according to the method of claim 33.

36. The composition formed according to the method of claim 34.

* * * * *